United States Patent [19]

Tsuchiya et al.

[11] Patent Number: 5,687,154
[45] Date of Patent: Nov. 11, 1997

[54] OPTICAL PICKUP DEVICE WHICH CAN BE ADAPTED TO PLURALITY OF TYPES OF OPTICAL DISKS

[75] Inventors: Yoichi Tsuchiya, Hashima; Seiji Kajiyama, Ibi-gun, both of Japan

[73] Assignee: Sanyo Electric Co., Ltd., Osaka, Japan

[21] Appl. No.: 578,501

[22] Filed: Dec. 26, 1995

[30] Foreign Application Priority Data

| May 8, 1995 | [JP] | Japan | 7-134804 |
| May 13, 1995 | [JP] | Japan | 7-138441 |
| May 30, 1995 | [JP] | Japan | 7-156855 |
| Aug. 12, 1995 | [JP] | Japan | 7-227128 |

[51] Int. Cl.$^6$ .................................................. G11B 7/00
[52] U.S. Cl. ........................... 369/112; 359/813; 359/821
[58] Field of Search .............................. 369/112, 109, 369/110, 103, 44.14; 359/813, 814, 821, 824

[56] References Cited

U.S. PATENT DOCUMENTS

| 4,462,096 | 7/1984 | Kusaka | 359/814 |
| 4,998,802 | 3/1991 | Kasuga et al. | 359/814 |
| 5,144,617 | 9/1992 | Gotoh et al. | 369/112 |
| 5,216,534 | 6/1993 | Boardman et al. | 359/821 |

OTHER PUBLICATIONS

Patent Documents of Japan vol. 13, No. 102 (P–841) Mar. 10, 1989 & JP-A-63 281251 Nov. 17, 1988 Japan.
Patent Documents of Japan vol. 16, No. 546 (P–1452) Nov. 17, 1992 & JP-A-04 205821 Jul. 28, 1992 Japan.
Patent Documents of Japan vol. 16, No. 57 (P–1314) Feb. 19, 1992 & JP-A-03 260934 Nov. 20, 1991 Japan.
Nikkei Electronics, 1995.2.27 (No. 630), pp. 88–100.
Spie vol. 2338 Optical Data Storage (1994), pp. 282–288.

*Primary Examiner*—Loha Ben
*Attorney, Agent, or Firm*—Darby & Darby

[57] ABSTRACT

An optical pickup device includes two objective lenses having numerical apertures different from each other, a lens holder for holding these objective lenses in common, a cylinder fixed to the lens holder, and four tracking coil pairs affixed onto a cylindrical surface of the cylinder. Two tracking coil pairs are displaced from the remaining two tracking coil pairs by a predetermined angle. When one objective lens is used, two tracking coil pairs corresponding to the objective lens are used for tracking control of the objective lens. The remaining two tracking coil pairs are used for positioning control of the objective lens.

18 Claims, 14 Drawing Sheets

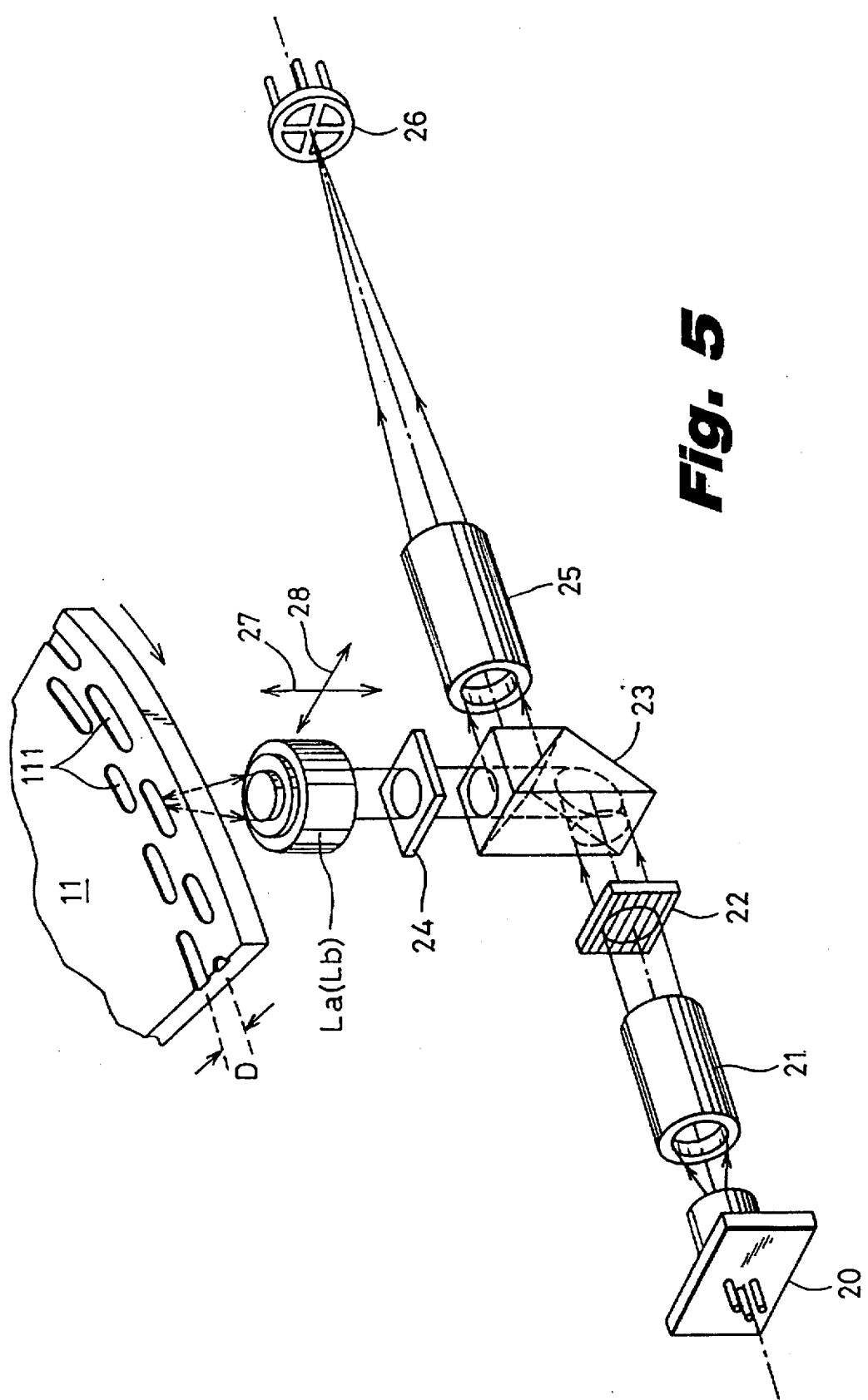

OPTICAL PICKUP DEVICE WHICH CAN BE ADAPTED TO PLURALITY OF TYPES OF OPTICAL DISKS

BACKGROUND OF THE INVENTION

1. Field of the Invention

The present invention relates to optical pickup devices, and more particularly, to an optical-pickup device which can be adapted to both an optical disk having a thick transparent substrate and an optical pickup device having a thin transparent optical disk.

2. Description of the Background Art

As a reproducing optical disk dealing with multimedia information, a CD-ROM and the like have been put to practical use. A CD-ROM is a medium having a diameter of 12 cm, a thickness of 1.2 mm, and a track pitch of 1.6 μm, on one side of which information for 540 Mbytes can be recorded. Recently, development of a digital video disk (DVD) having video information recorded on the CD-ROM using an image compression data technology such as an MPEG has been remarkable. However, the current CD-ROM can record only video data for approximately 20 minutes according to an MPEG-2 standard (data transfer rate 4 Mbps). Therefore, the current CD-ROM is insufficient in capacity to store video information for approximately two hours.

In order to solve this problem, a high density technology has been developed remarkably for making a recording density of an optical disk which is a medium for reproducing information several times as high as the current recording density. For example, an SD (super density) standard is proposed which records information for approximately 5 Gbytes on one side of a disk having the same diameter as that of the CD-ROM (12 cm). A disk according to the SD standard employs an efficient modulation system with a track pitch (D in FIG. 5) of approximately 0.725 μm and the shortest pit length of approximately 0.4 μm. The thickness of the SD specified disk is approximately 0.6 mm. A double-sided optical disk having two such disks affixed to each other can record information for approximately 10 Gbytes. This amount of information corresponds to video information for approximately four hours. In this SD specified disk, a program area starts at a position 24 mm apart from the center of the disk.

Further, an MMCD (multimedia compact disk) standard (which was previously called as an "HDMCD") is proposed which stores information for approximately 3.7 Gbytes on one side of a disk having the same diameter as that of the CD-ROM (12 cm). According to the MMCD standard, the track pitch is approximately 0.84 μm, and the shortest pit length is approximately 0.45 μm. The thickness of the MMCD specified disk is 1.2 mm. In this MMCD specified disk, a program area starts at a position 23 mm apart from the center of the disk.

In order to carry out reproduction on a disk having a high recording density, the spot diameter of a laser beam must be diaphragmed. To do so, it is considerable that the wavelength of a laser of an optical pickup device is shortened (for example, approximately 635 nm), and that the numerical aperture (NA) of an objective lens is made large (for example, approximately 0.6). However, the aberration by inclination of a disk increases in direct proportion to the cube of the numerical aperture of the objective lens. Therefore, making the numerical aperture of the objective lens too large causes decrease of an inclination margin of the disk. On the other hand, the aberration also increases in direct proportion to the thickness of the disk. Therefore, in order to solve the above described problem, an attempt is made to decrease a disk substrate in thickness. Under the condition of the same numerical aperture of an objective lens, the SD specified disk having a thickness of approximately 0.6 mm which is announced as DVD has an inclination margin two times as large as that of a conventional CD having a thickness of approximately 1.2 mm, for example. The above background art of the present invention is described in pages 88 to 100 of "Nikkei Electronics", published on Feb. 27, 1995.

An objective lens of an optical pickup device is generally designed taking the thickness of a transparent substrate of an optical disk into consideration. Therefore, when reproduction is carried out on, using an objective lens designed to be adapted to an optical disk having a certain thickness, another optical disk having a different thickness, the focal point of a laser beam is dispersed in the depth direction due to the spherical aberration, making it difficult to reproduce information favorably. For example, when reproduction is carried out on an optical disk having a thickness of approximately 1.2 mm using an objective lens designed to be adapted to an optical disk having a thickness of approximately 0.6 mm, the peak value at the center in an intensity distribution of the laser is substantially decreased on a recording surface of the optical disk, whereby the spot diameter is increased. As a result, it is difficult to carry out favorable reproduction.

In the future, coexistence of a disk having a standard density and a thickness of approximately 1.2 mm (CD, CD-ROM), a disk having a high density and a thickness of approximately 1.2 mm (MMCD), and a disk having a high density and a thickness of approximately 0.6 mm (SD) is expected. Therefore, an optical pickup device which can reproduce information on both the CD and the like and the SD, or an optical pickup device which can reproduce information on both the SD and the MMCD is desired.

SUMMARY OF THE INVENTION

One object of the present invention is to provide an optical pickup device which can reproduce information on two or more types of disks.

According to one aspect of the present invention, an optical pickup device for directing a laser beam to an optical disk includes a plurality of objective lenses and a moving unit. Each of the objective lenses is designed to be adapted to a corresponding type of optical disk. The moving unit selectively moves the plurality of objective lenses according to the type of optical disk so that their axes match an optical path of the laser beam.

Since this optical pickup device selectively uses the plurality of objective lenses according to the type of optical disk, this optical pickup device can reproduce information on a plurality of types of optical disks.

According to another aspect of the present invention, an optical pickup device includes a laser, first and second objective lenses, a holder, a shaft, a magnet, first and second coil pairs, a lens positioning circuit, and a tracking control circuit. The laser directs a laser beam to an optical disk. The first objective lens has a first numerical aperture. The second objective lens has a second numerical aperture which is larger than the first numerical aperture. The holder holds the first and second objective lenses in common. The shaft rotatably holds the holder. The holder has a cylindrical surface having an axis common to the shaft. The magnet generates a magnetic field perpendicular to the cylindrical surface. The first coil pair includes first and second coils. The first coil is affixed onto the cylindrical surface. The second coil, located apart from the first coil, is affixed onto the cylindrical surface. The second coil pair includes third and fourth coils. The third coil, positioned between the center of the first coil and the center of the second coil, is affixed onto the cylindrical surface. The fourth coil, located apart from the third coil, is affixed onto the cylindrical surface. The first coil is positioned between the center of the third coil and the center of the fourth coil. The lens positioning circuit selectively supplies a positioning current to the first and second coil pairs according to the type of optical disk. When the positioning current is supplied to the first coil pair, the tracking control circuit supplies a tracking drive current to the second coil pair in one direction upon displacement of the laser beam toward one side of a track of the optical disk, and supplies the tracking drive current to the second coil pair in a direction opposite to the above one direction upon displacement of the laser beam toward the other side opposite to the above one side. When the positioning current is supplied to the second coil pair, the tracking control circuit supplies the tracking drive current to the first coil pair in one direction upon displacement of the laser beam toward one side of the track of the optical disk, and supplies the tracking drive current to the first coil pair in a direction opposite to the above one direction upon displacement of the laser beam toward the other side opposite to the above one side.

Therefore, when controlling the objective lenses so that the laser beam traces the track of the optical disk with a high fidelity using one of the first and second coil pairs, the optical pickup device can control the objective lenses so that the optical axes match an optical path of the laser beam using the other coil pair.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a perspective view showing an optical system of an optical pickup device including one objective lens in FIG. 1.

DESCRIPTION OF THE PREFERRED EMBODIMENTS

Figure 1:
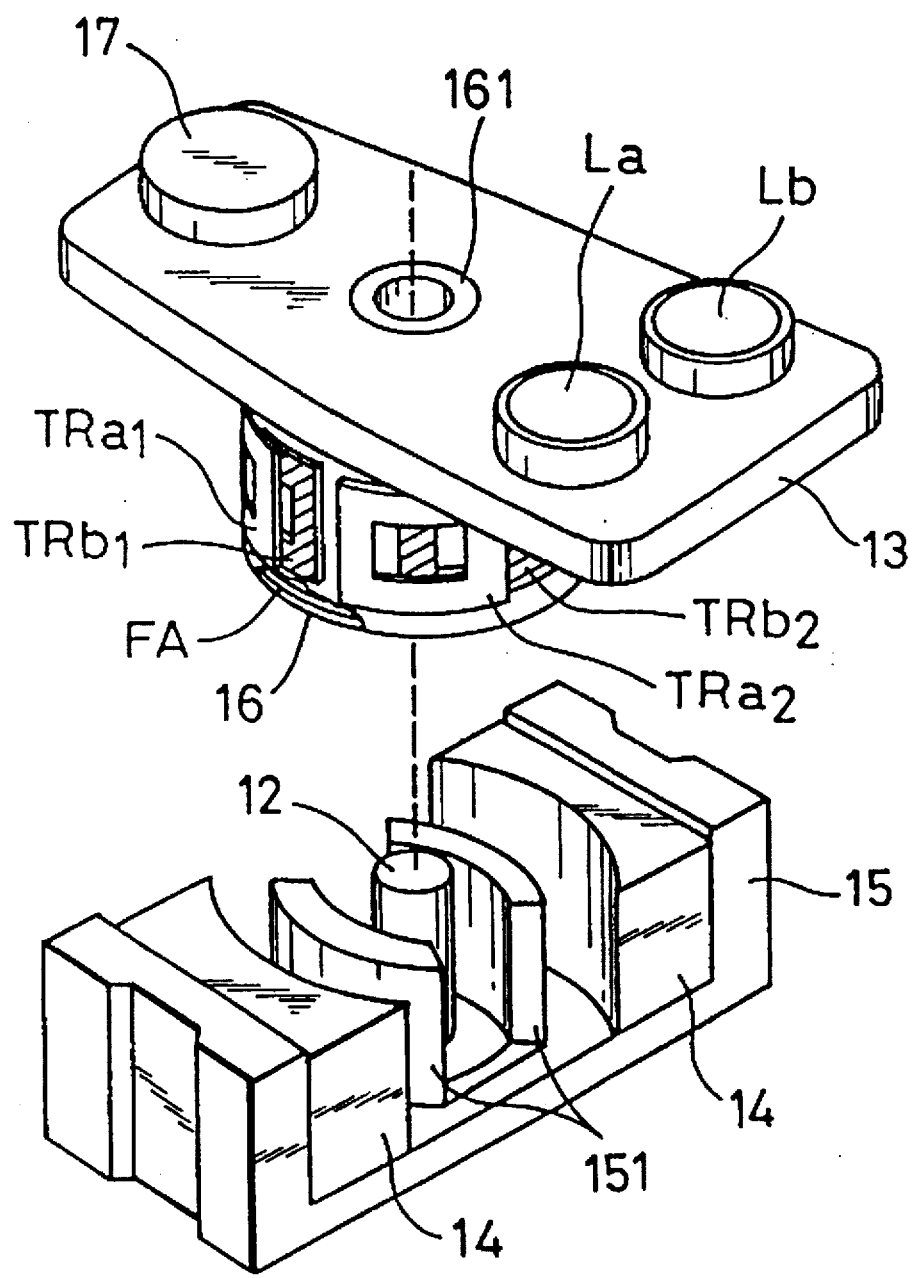
FIG. 1 is a perspective view showing a main structure of an optical pickup device according to a first embodiment of the present invention.

Embodiments of the present invention will be described in detail hereinafter with reference to the drawings. Note that the same reference characters denote the same or corresponding portions in the drawings.

First Embodiment

First, an optical pickup device is described which has a compatibility between an optical disk having a thickness of 1.2 mm and a standard density (disk according to the CD standard) and an optical disk having a thickness of 0.6 mm and a high density (disk according to the SD standard). This optical pickup device includes an objective lens having a numerical aperture of 0.45 (±0.02) designed according to the CD standard and a semiconductor laser having a wavelength of 780 (±15) nm. The optical pickup device further includes another objective lens having a numerical aperture of 0.6 (±0.02) designed according to the SD standard and another semiconductor laser having a wavelength of 650 (±15) nm or 635 (±15) nm. The numerical aperture of each objective lens is designed taking the thickness of a corresponding optical disk into consideration. Table 1 shows wavelengths of semiconductor lasers and numerical apertures of objective lenses adapted to the SD, MMCD, and CD standards.

TABLE 1

| | Laser wavelength (tolerance ± 15 nm) | Numerical aperture of objective lens (tolerance ± 0.02) |
| --- | --- | --- |
| SD | 650 (635) | 0.6 |
| MMCD (HDMCD) | 635 (650) | 0.52 |
| CD | 780 (635, 650) | 0.45 (0.52) |

Referring to FIG. 1, the optical pickup device according to the first embodiment includes a yoke 15 fixed to the body (not shown) of the pickup device, a shaft 12 fixed to the body of the pickup device, a pair of magnets 14 fixed at a 180° position on yoke 15 with shaft 12 at the center, a cylinder 16 rotatably supported by shaft 12, a lens holder 13 fitted in a cylindrical projection 161 of cylinder 16, a focus coil FA wound around cylinder 16, four tracking coil pairs affixed onto focus coil FA, and a balancer 17 held by lens holder 13.

Yoke 15 has two projections 151 opposite to each other with shaft 12 therebetween. Two magnetics 14 are arranged with the same polarity (N polarity for example) faced toward shaft 12. Therefore, a magnetic field is generated between magnet 14 and projection 151 in a direction perpendicular to a cylindrical surface of cylinder 16.

Figure 2:
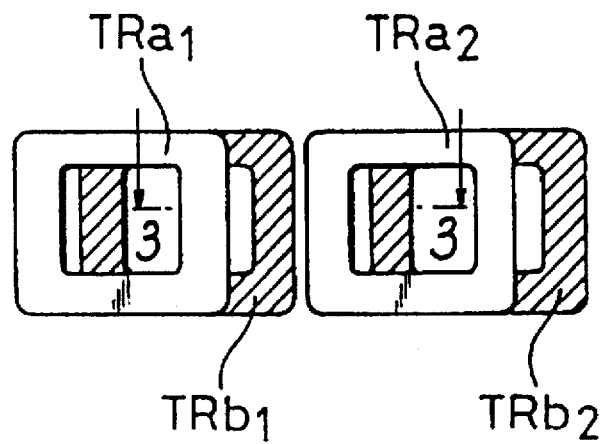
FIG. 2 is a development showing two tracking coil pairs in FIG. 1 in a planar manner.
Figure 3:
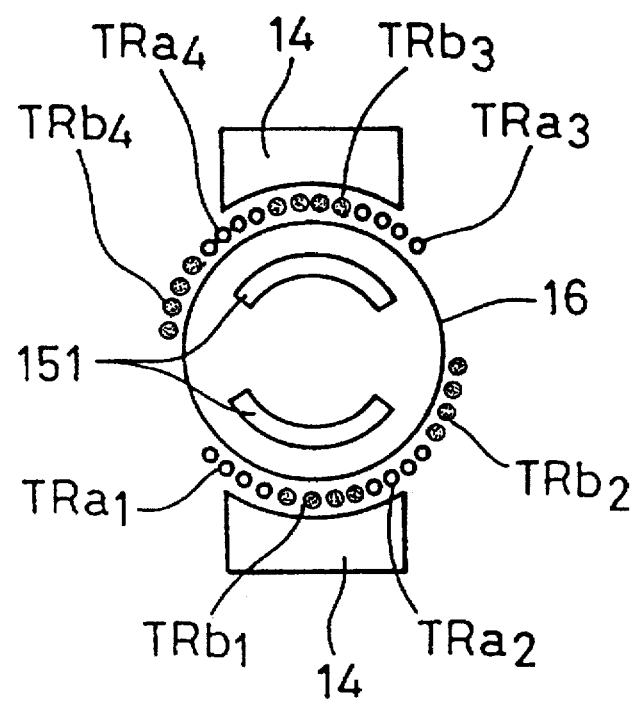
FIG. 3 is a top view for describing operation of the optical pickup device in FIG. 1.

In FIG. 1, only two tracking coil pairs TRa1, TRa2, and TRb1, TRb2 are shown. Tracking coils TRa1 and TRa2 form one pair, while tracking coils TRb1 and TRb2 form another pair. The other two tracking coil pairs not shown are opposite to tracking coil pairs TRa1, TRa2, and TRb1, TRb2, respectively. Referring to FIG. 2, tracking coil pair TRa1, TRa2 is affixed onto the cylindrical surface of cylinder 16 with a slight displacement from tracking coil pair TRb1, TRb2. Each tracking coil is wound around an axis perpendicular to the axis of shaft 12. The other two tracking coil pairs not shown are structured similarly. FIG. 3 shows not only tracking coil pairs TRa1, TRa2, and TRb1, TRb2, but also the other tracking coil pairs TRa3, TRa4, and TRb3, TRb4 opposite thereto. Note that only a cross section of tracking coil pairs TRa1, TRa2, and TRb1, TRb2 along the line III—III in FIG. 2 is shown. The other tracking coil pairs TRa3, TRa4, and TRb3, TRb4 are arranged similarly. Tracking coils TRa3 and TRa4 form one pair, while tracking coils TRb3 and TRb4 form another pair. Tracking coil TRa3 is opposite to tracking coil TRa1. Tracking coil TRa4 is opposite to tracking coil TRa2. Tracking coil TRb3 is opposite to tracking coil TRb1. Tracking coil TRb4 is opposite to tracking coil TRb2.

Figure 4:
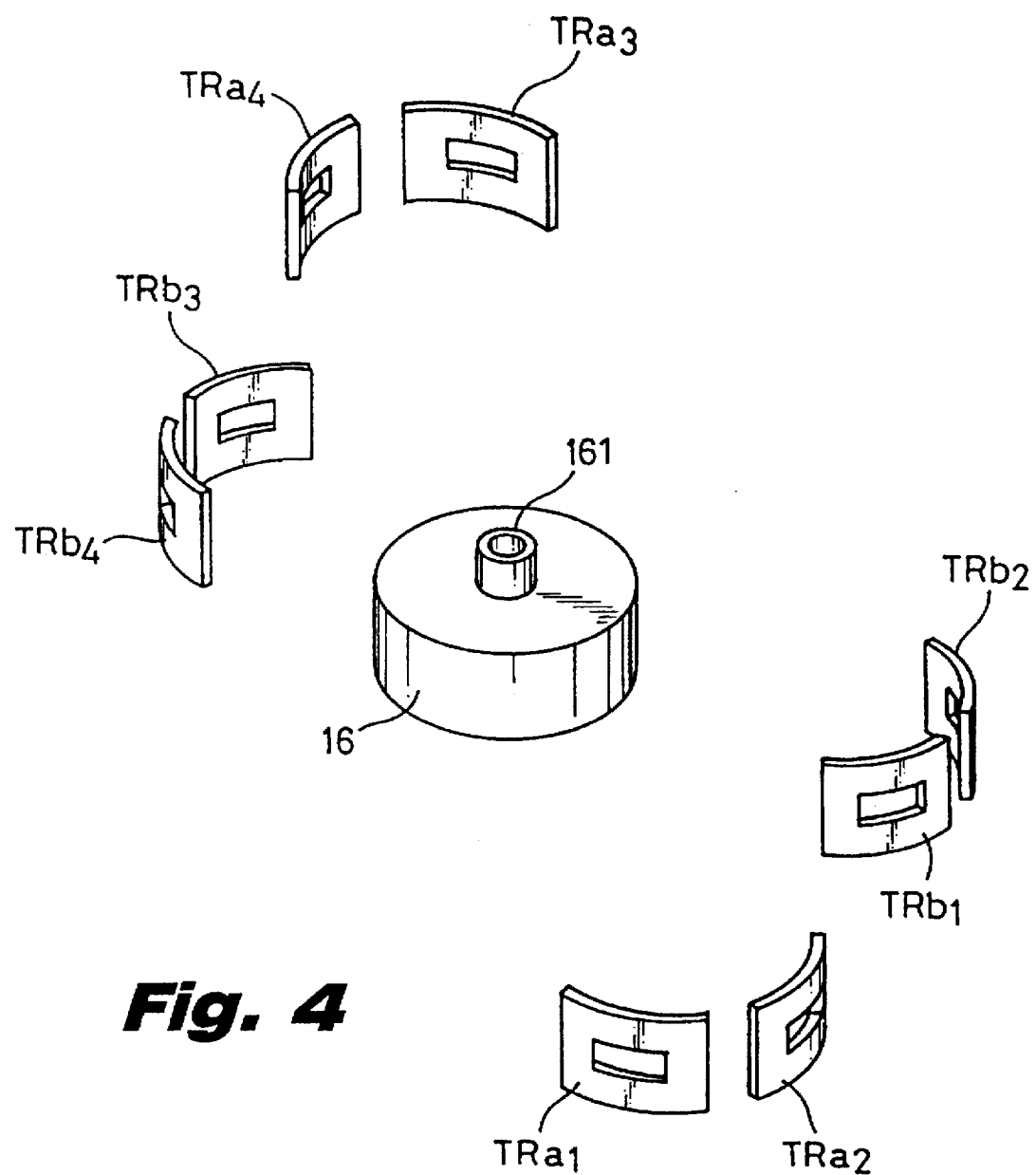
FIG. 4 is an exploded perspective view showing a cylinder and a focus coil in FIG. 1.

Referring to FIG. 4, first, tracking coil pairs TRb1, TRb2, and TRb3, TRb4 are affixed onto the cylindrical surface of cylinder 16, and then tracking coil pairs TRa1, TRa2, and TRa3, TRa4 are affixed thereon with a slight displacement therefrom.

Referring to FIG. 1 again, objective lenses La and Lb are arranged at the same distance from the axis of shaft 12 with a predetermined space. Balancer 17 is arranged opposite to objective lenses La and Lb with the axis of shaft 12 at the center.

Objective lens Lb is designed to be adapted to the CD specified optical disk. More specifically, objective lens Lb, having a numerical aperture of 0.45, converges a laser beam having a wavelength of 780 nm on a recording surface of the CD specified optical disk. On the other hand, objective lens La is designed to be adapted to the SD specified optical disk. More specifically, objective lens La, having a numerical aperture of 0.6, converges a laser beam having a wavelength of 650 nm on a recording surface of the SD specified optical disk.

Referring to FIG. 5, the optical pickup device further includes a semiconductor laser 20, a collimator lens 21, a diffraction grating 22, a polarization beam splitter 23, a ¼ wavelength plate 24, a collimator lens 25, and a photodetector 26. In FIG. 5, only one of objective lenses La and Lb in FIG. 1 is shown. A laser beam emitted from semiconductor laser 20 passes through collimator lens 21, diffraction grating 22, polarization beam splitter 23, ¼ wavelength plate 24, and objective lens La (Lb) to lead to a pit 111 of an optical disk 11. Further, light reflected from optical disk 11 leads to photodetector 26 through objective lens La (Lb), ¼ wavelength plate 24, polarization beam splitter 23, and collimator lens 25.

Figure 6A:
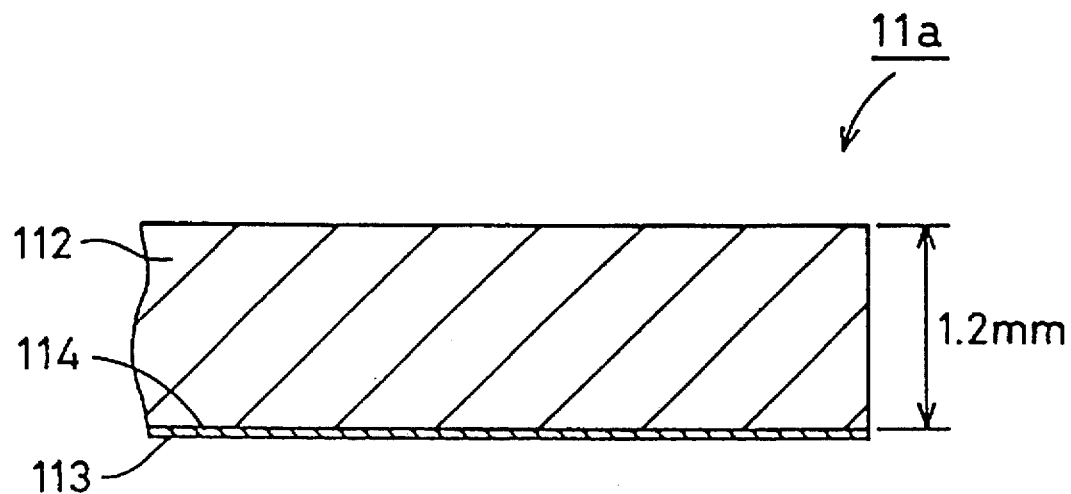
FIGS. 6A and 6B are schematic sectional views showing a part of an optical disk used in the optical pickup device according to the present invention.

FIG. 6A is a sectional view showing a part of the structure of optical disk 11a according to the CD standard which can reproduce information using objective lens Lb. Referring to FIG. 6A, optical disk 11a includes a transparent substrate 112 formed of polycarbonate or the like and a protection film 113 covering a recording surface 114 of transparent substrate 112. Transparent substrate 112 of optical disk 11a has a thickness of 1.2 mm. Protection film 113 of optical disk 11a has a thickness of several 10 μm. Therefore, the total thickness of optical disk 11a is substantially determined by the thickness of transparent substrate 112. Note that an optical disk of a double-sided recording system including two optical disks 11a bonded to each other with protection film 113 therebetween may be used.

Figure 6B:
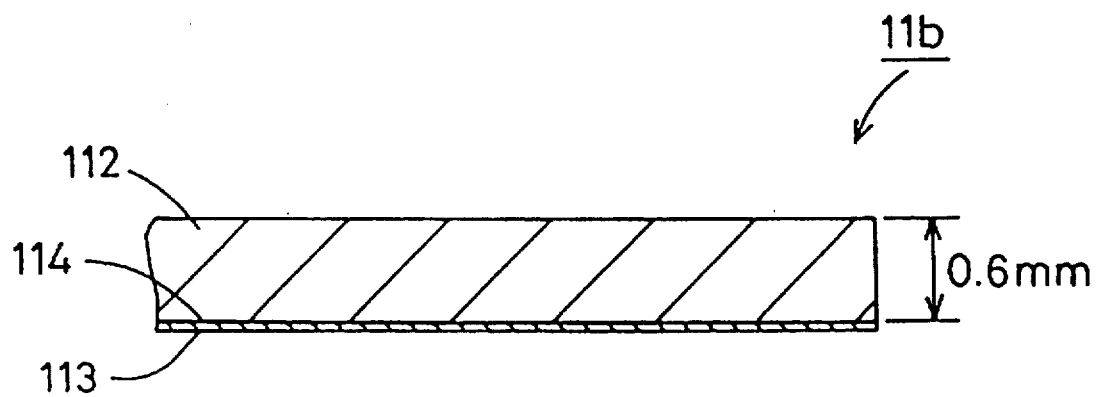

FIG. 6B is a sectional view showing a part of the structure of optical disk 11b according to the SD standard which can reproduce information using objective lens La. Referring to FIG. 6B, optical disk 11b includes transparent substrate 112 formed of polycarbonate or the like and protection film 113 covering recording surface 114 of transparent substrate 112. Transparent substrate 112 of optical disk 11b has a thickness of 0.6 mm smaller than transparent substrate 112 of optical disk 11a. The total thickness of optical disk 11b is substantially determined by the thickness of transparent substrate 112, similarly to the case of optical disk 11a. Similarly to the above, an optical disk of a double-sided recording system having two such optical disks 11b bonded to each other with protection film 113 therebetween may be used.

Figure 7A:
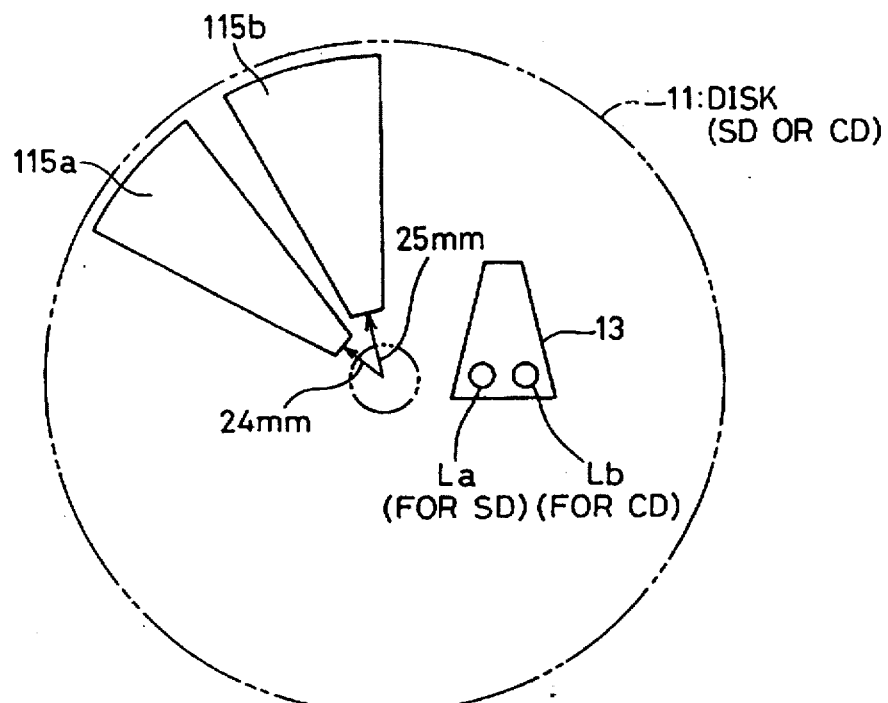
FIGS. 7A and 7B are top views showing an arrangement of two objective lenses in the optical pickup device.

Referring to FIG. 7A, objective lens Lb for CD is positioned closer to the periphery of disk 11 on lens holder 13 than objective lens La for SD. From the opposite standpoint, objective lens La for SD is positioned closer to the center of disk 11 than objective lens Lb for CD. This is because a program area 115b starts at a position 25 mm apart from the center of disk 11 according to the CD standard, and because a program area 115a starts at a position 24 mm apart from the center of disk 11 according to the SD standard. Therefore, even when such an optical pickup device is positioned the closest to the center of disk 11, it can reproduce information on either disk of the CD or SD standard efficiently.

Figure 8:
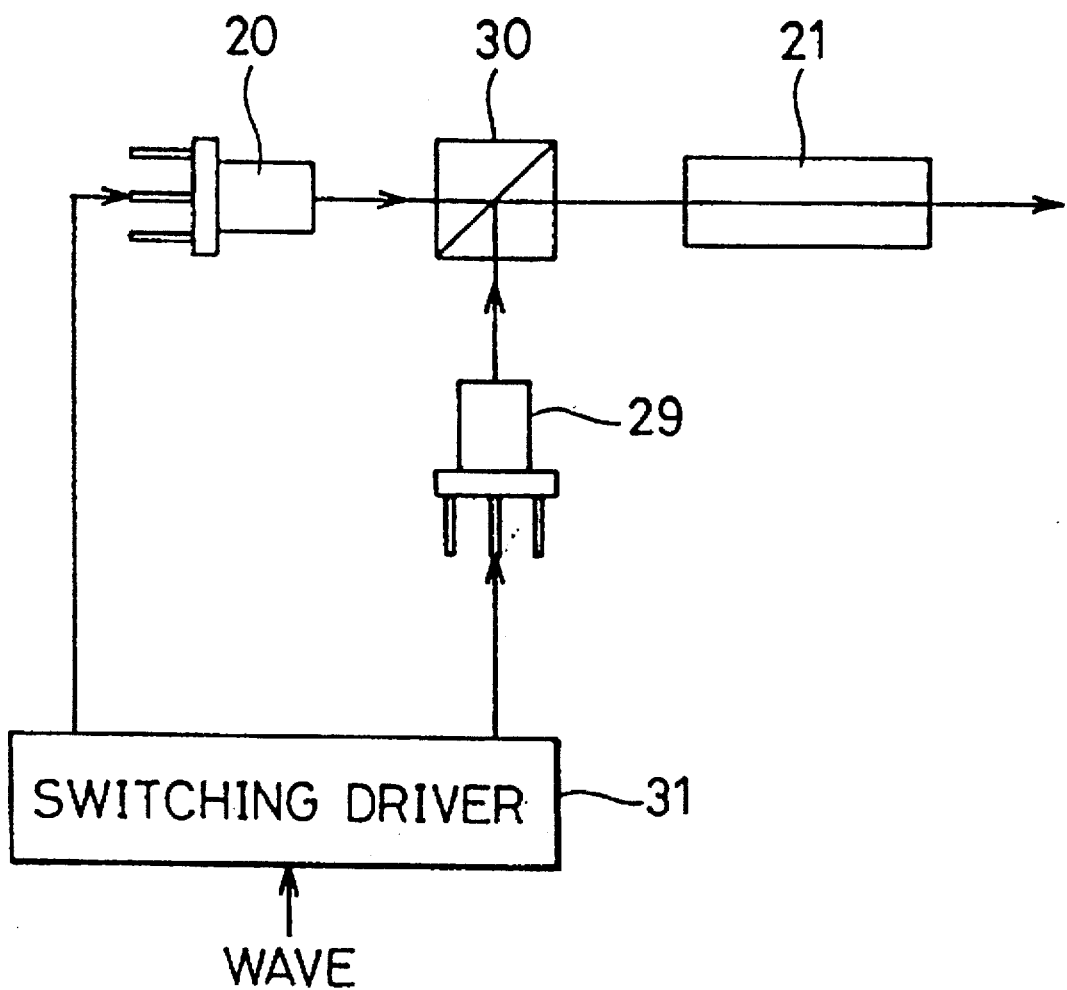
FIG. 8 is a block diagram including a semiconductor laser in the optical pickup device of FIG. 5.

Referring to FIG. 8, the optical pickup device further includes, in addition to semiconductor laser 20, another semiconductor laser 29, a beam splitter 30, and a switching driver 31 for selectively activating semiconductor lasers 20 and 29. Semiconductor laser 29 for optical disk 11a according to the CD standard directs a laser beam having a wavelength of 780 nm. On the other hand, semiconductor laser 20 for optical disk 11b according to the SD standard directs a laser beam having a wavelength of 650 nm. Therefore, the laser beam emitted from semiconductor laser 29 is directed to optical disk 11a of the CD standard through objective lens Lb. The laser beam is refracted in objective lens Lb and transparent substrate 112 of optical disk 11a to be converged on each track on recording surface 114 thereof. On the other hand, the laser beam emitted from semiconductor laser 20 is directed to optical disk 11b of the SD standard through objective lens La. This laser beam is refracted in objective lens La and transparent substrate 112 of optical disk 11b to be converged on each track on recording surface 114 thereof.

Figure 9:
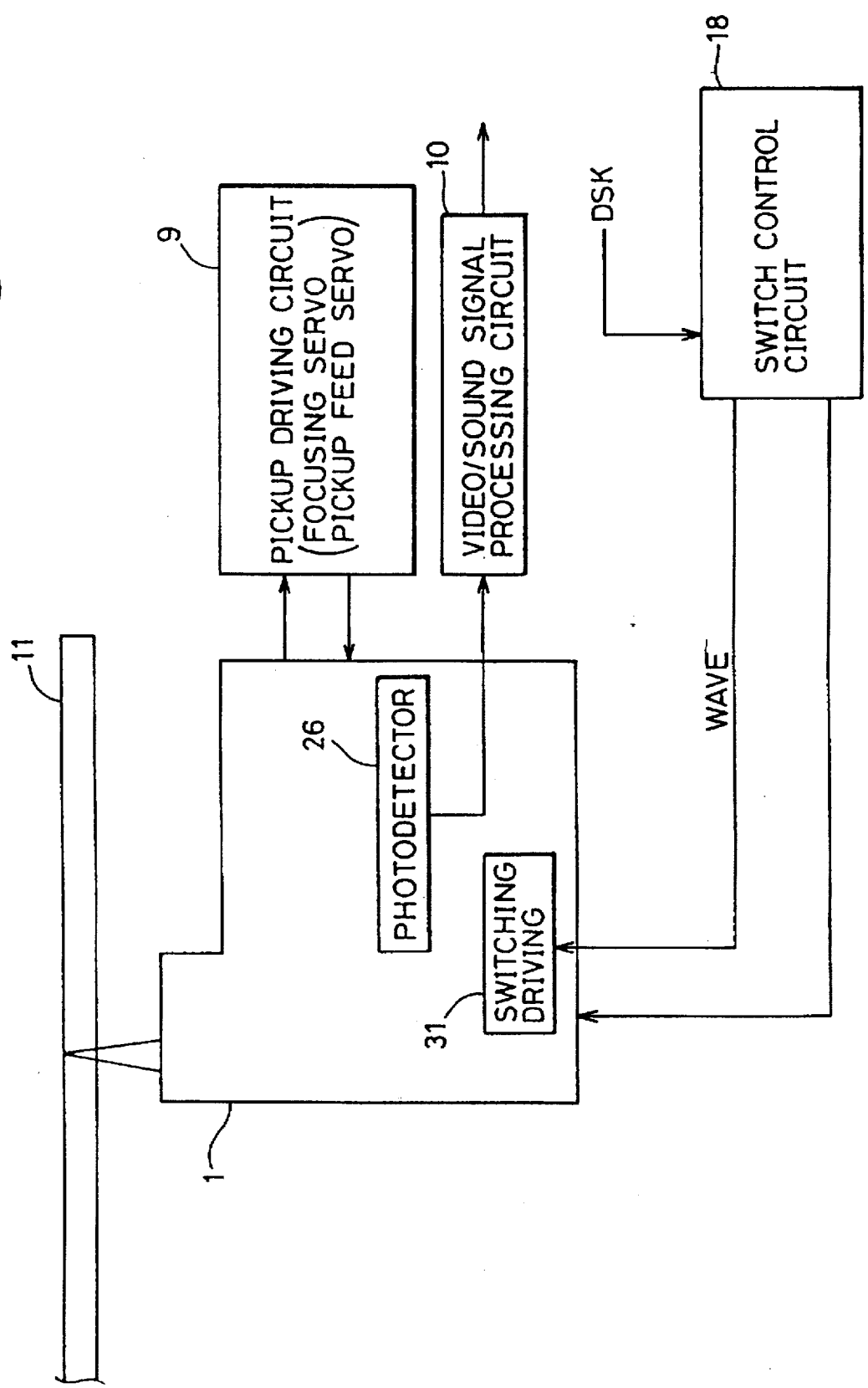
FIG. 9 is a block diagram showing a structure of an optical reproducing apparatus including the optical pickup device of FIG. 1.

Referring to FIG. 9, an optical reproducing apparatus includes, in addition to the above described optical pickup device 1, a pickup driving circuit 9 for moving optical pickup device 1 in various directions, a video/sound signal processing circuit 10 for processing a detect signal from photodetector 26 of optical pickup device 1, and a switch control circuit 18 for switching optical pickup device 1 to CD or SD. Pickup driving circuit 9 has a pickup feed servo function for moving optical pickup device 1 in the radial direction of optical disk 11 and a focusing servo function for moving optical pickup device 1 in a direction perpendicular to recording surface 114 of optical disk 11. More specifically, pickup driving circuit 9 supplies a controlled current to focus coil FA in FIG. 1, thereby sliding cylinder 16 in the axis direction of shaft 12. Video/sound signal processing circuit 10 applies predetermined known processing to the pulse signal from photodetector 26, thereby generating a video signal and a sound signal.

Figure 10:
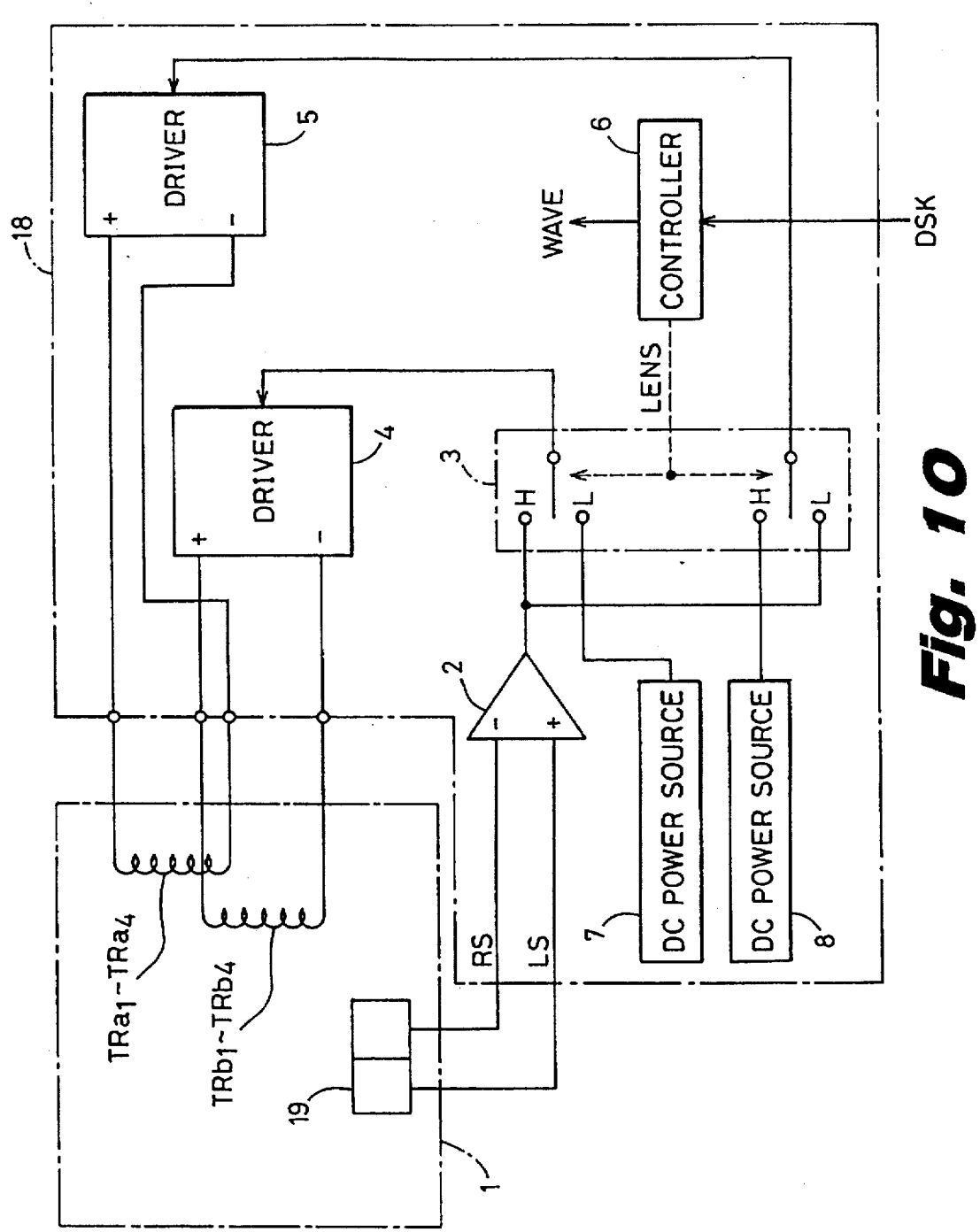
FIG. 10 is a block diagram showing in detail a main structure of the optical reproducing apparatus of FIG. 9.

The detail of switch control circuit 18 is shown in FIG. 10. Referring to FIG. 10, optical pickup device 1 further includes a tracking sensor 19 detecting whether or not the laser beam traces a track on optical disk 11 with a high fidelity. When the laser beam is displaced toward the right side of the track in its travelling direction, the level of a detect signal RS increases. On the other hand, when the laser beam is displaced toward the left side, the level of a detect signal LS increases.

Four tracking coils TRa1 to TRa4 shown in FIGS. 1 to 4 are connected in series. Tracking coils TRb1 to TRb4 are also connected in series.

Switch control circuit 18 includes a differential amplifier 22 for amplifying the difference in level between detect signals RS and LS from tracking sensor 19, d.c. power sources 7 and 8, a switch 3 for switching between differential amplifier 2 and d.c. power sources 7, 8, a tracking coil driver 4 for driving tracking coils TRb1 to TRb4, a tracking coil driver 5 for driving tracking coils TRa1 to TRa4, and a controller 6 for generating a control signal LENS for controlling switch 3 and a control signal WAVE for controlling switching driver 31 in FIG. 8 in response to a disk discriminate signal DSK indicating the type of disk 11 set in the optical reproducing apparatus. Disk discriminate signal DSK is desirably generated by automatically detecting the type of set optical disk 11. Here, since controller 6 generates control signal LENS at an L (logical low) level upon setting of optical disk 11b of the SD standard, switch 3 causes an output signal from differential amplifier 2 to be supplied to driver 5, and a direct current from d.c. power source 7 to be supplied to driver 4. At this time, switching driver 31 in FIG. 8 activates semiconductor laser 20 for SD in response to control signal WAVE from controller 6. On the other hand, since controller 6 generates control signal LENS at an H (logical high) level upon setting of optical disk 11a of the CD standard, switch 3 causes an output signal from differential amplifier 2 to be supplied to driver 4, and a direct current from d.c. power source 8 to be supplied to driver 5. At this time, switching driver 31 in FIG. 8 activates semiconductor laser 29 for CD in response to control signal WAVE from controller 6.

Operation of the optical reproducing apparatus including this optical pickup device will now be described.

(1) The case where optical disk 11b according to the SD standard is set

When optical disk 11b according to the SD standard is set, controller 6 generates control signal LENS at the L level in response to disk discriminate signal DSK. In response to control signal LENS at the L level, switch 3 supplies an output signal from differential amplifier 2 to driver 5, and a direct current from d.c. power source 7 to driver 4. Simultaneously, controller 6 controls switching driver 31, whereby semiconductor laser 20 for SD is activated.

Driver 4 supplies the direct current to tracking coils TRb1 to TRb4. Referring to FIG. 3, this current supply causes a current to flow in tracking coil TRb1 between tracking coils TRa1 and TRa2 in one direction and also in tracking coil TRb3 opposite to tracking coil TRb1 in one direction. Therefore, tracking coils TRb1 and TRb3 rotate cylinder 16. As a result, objective lens La for SD is moved so that its optical axis matches an optical path of the laser beam.

On the other hand, driver 5 supplies a current flowing like an alternating current to tracking coils TRa1 to TRa4 in response to an output signal from differential amplifier 2. When the laser beam is displaced toward the right side of a track, the level of detect signal RS increases, causing driver 5 to supply a current to tracking coils TRa1 to TRa4 in one direction. On the other hand, when the laser beam is displaced toward the left side of the track, the level of detect signal LS increases, causing driver 5 to supply a current to tracking coils TRa1 to TRa4 in the other direction opposite to the above one direction. When the laser beam is directed directly on the track, driver 5 does not supply a current to tracking coils TRa1 to TRa4 at all. Therefore, tracking coils TRa1 to TRa4 rotate cylinder 16 in both directions alternately in response to detect signals RS and LS from tracking sensor 19. As a result, objective lens La for SD is moved right and left so that the laser beam always traces the track with a high fidelity.

As described above, when optical disk 11a for SD is set, tracking coils TRa1 to TRa4 are used for tracking control, and tracking coils TRb1 to TRb4 are used for switching from objective lens Lb to objective lens La.

(2) The case where optical disk 11a according to the CD standard is set

When optical disk 11a according to the CD standard is set, controller 6 generates control signal LENS at the H level. In response to control signal LENS at the H level, switch 3 supplies an output signal from differential amplifier 2 to driver 4, and a direct current from d.c. power source 8 to driver 5. Simultaneously, controller 6 controls switching driver 31 in FIG. 8, whereby semiconductor laser 29 for CD is activated.

Since driver 5 supplies the direct current to tracking coils TRa1 to TRa4, tracking coils TRa1 to TRa4 rotate cylinder 16 so that the optical axis of objective lens Lb for CD matches an optical path of the laser beam. On the other hand, driver 4 supplies a current flowing like an alternating current to tracking coils TRb1 to TRb4 in response to detect signals RS and LS from tracking sensor 19. As a result, tracking coils TRb1 to TRb4 rotate cylinder 16 in both directions alternately so that the laser beam always traces a track with a high fidelity.

As described above, when optical disk 11a according to the CD standard is set, tracking coils TRb1 to TRb4 are used for tracking control of objective lens Lb for CD, and tracking coils TRa1 to TRa4 are used for switching from objective lens La for SD to objective lens Lb for CD.

According to the above described first embodiment, since the optical pickup device includes objective lens La for SD and objective lens Lb for CD, objective lenses La and Lb are switched according to the type of a set optical disk. Therefore, the optical reproducing apparatus including such an optical pickup device can accurately reproduce information not only on optical disk 11b according to the SD standard but also on optical disk 11a according to the CD standard.

Although the wavelength of semiconductor laser 20 for SD was 650 nm as shown in Table 1 in the above described first embodiment, the wavelength of semiconductor laser 20 may be 635 nm. Although the wavelength of semiconductor laser 29 for CD was 780 nm, the wavelength may be 635 nm or 650 nm instead. The wavelength of semiconductor laser 29 for CD may be the same as that of semiconductor laser 20 for SD. Therefore, one semiconductor laser may be used both for the SD specified optical disk and the CD specified optical disk. Further, although the numerical aperture of objective lens Lb for CD was 0.45, the numerical aperture may be even smaller when the wavelength of semiconductor laser 29 is shorter.

Further, in the above described first embodiment, objective lens La was designed to be adapted to the SD specified optical disk, and objective lens Lb was designed to be adapted to the CD specified optical disk as shown in the following Table 2. However, objective lens Lb may be designed to be adapted to an optical disk according not to the CD standard but to the MMCD standard. In this case, objective lens Lb is designed to have a numerical aperture of approximately 0.52, and a semiconductor laser having a wavelength of 635 or 650 nm is used. This is also indicated in the above Table 1.

As shown in Table 2, objective lens Lb may be designed to be adapted to a CD-R specified optical disk (recordable compact disk), not to the CD specified optical disk. Further, objective lens Lb may be designed to be adapted not to the MMCD specified optical disk but to the CD specified disk.

TABLE 3

The case of disk of 0.8 mm in thickness

| | |
|---|---|
| Numerical aperture of objective lens | 0.55 |
| Laser wavelength | 680 nm |

The following Table 4 shows specifications of optical disks according to the MMCD (HDMCD), SD, CD, and MOD standards. As shown in the following Table 4, the SD specified optical disk has a track pitch of 0.725 μm, and the CD specified optical disk has a track pitch of 1.6 μm. Therefore, the SD specified optical disk has a recording density higher than the CD specified optical disk. The MMCD specified optical disk has a track pitch of 0.84 μm. Therefore, the SD specified optical disk has a recording density higher than the MMCD specified optical disk.

TABLE 4

| Name | MMCD(HDMCD) standard | SD standard | CD standard | MOD standard |
|---|---|---|---|---|
| Disk specification | | | | |
| Disk diameter | 120 mm | 120 mm | 120 mm | 88 mm |
| disk inner diameter | 15 mm | 15 mm | 15 mm | 6 mm |
| Disk substrate thickness | 1.2 mm | 0.6 mm | 1.2 mm | 0.8 mm |
| Start diameter of recording area | 46 mm | 48 mm | 50 mm | 23.72 mm |
| Max. diameter of recording area | 116 mm | 116 mm | 116 mm | 41 mm |
| Track pitch | 0.84 μm | 0.725 μm | 1.6 μm | 1.2 μm |
| Shortest recording mark length | 0.451 μm | 0.40–0.43 μm (unfixed) | 0.9 μm | |
| Linear velocity | approximately 4 m/sec. | approximately 4 m/sec. | approximately 1.3 m/sec. | |
| Disk rotation control system | CLV | CLV | CLV | ZCAV |
| Data transfer rate | max. 11.2 Mbps | max. 10 Mbps | max. 1.5 Mbps | 8–16 Mbps |
| Total recording capacity | approximately 3.7 GB | approximately 5 GB (single side) | approximately 650 MB | approximately 650 MB |
| Pluralization system of recording surface | two-layered recording | double-sided recording | none | none |
| Substrate material | polycarbonate | polycarbonate | polycarbonate | polycarbonate |

TABLE 2

| | | |
|---|---|---|
| Numerical aperture of lens La | approximately 0.6 | |
| Laser wavelength | 650 (635) | |
| Object disk standard | SD | |
| Numerical aperture of lens Lb | approximately 0.52 | approximately 0.45 |
| Laser wavelength | 635, 650 | 780 |
| Object disk standard | HDMCD (MMCD), CD | CD, CD-R |

As shown in Table 2, objective lens Lb may be designed to be adapted to an optical disk according to the MMCD or CD standard, and objective lens La may be designed to be adapted to a magneto-optic disk (optical disk according to an MOD standard) as shown in Table 3, instead of the SD specified optical disk. In this case, objective lens La is designed to have a numerical aperture of 0.55, and a semiconductor laser having a wavelength of 680 nm is used.

Further, as shown in the above Table 2, objective lens La may be designed to be adapted to the SD specified optical disk, and objective lens Lb may be designed to be adapted to such an optical disk shown in the following Table 3.

Figure 7B:
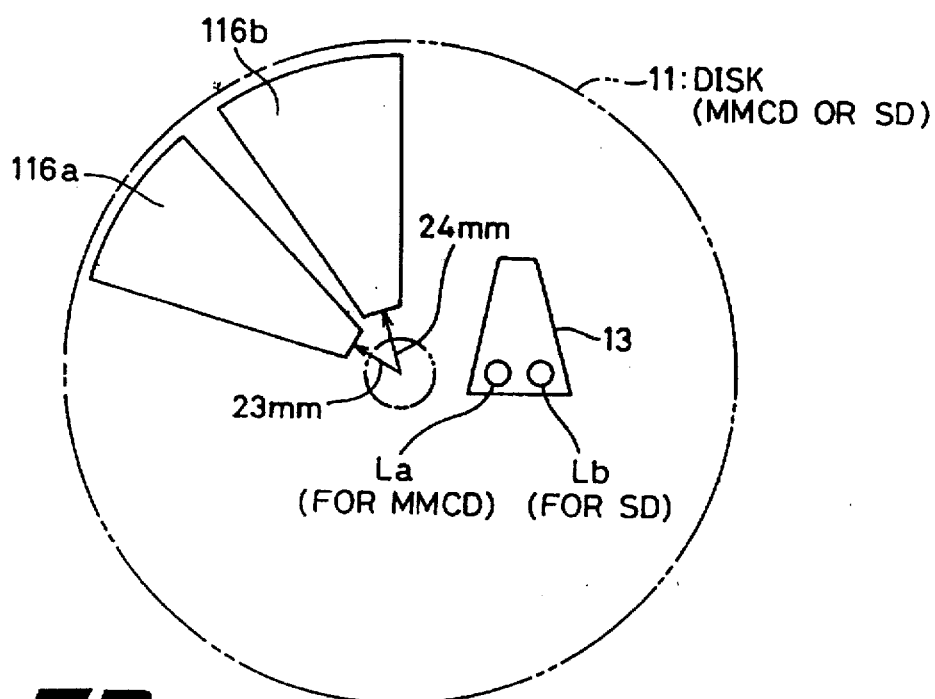

In the above described first embodiment, objective lens La for SD is positioned closer to the center of optical disk 11 than objective lens Lb for CD, as shown in FIG. 7A. However, when objective lens La is designed to be adapted to the MMCD standard, and objective lens Lb is designed to be adapted to the SD standard, objective lens La for MMCD is positioned closer to the center of optical disk 11 than objective lens Lb for SD as shown in FIG. 7B. This is because a program area 116b starts at a position 24 mm apart from the center of optical disk 11 according to the SD standard, while a program area 116a starts at a position 23 mm apart from the center of optical disk 11 according to the MMCD standard. Therefore, even when such an optical pickup device is positioned the closest to the center of optical disk 11, the optical pickup device can efficiently reproduce information on either optical disk according to the SD or MMCD standard.

Second Embodiment

Figure 11:
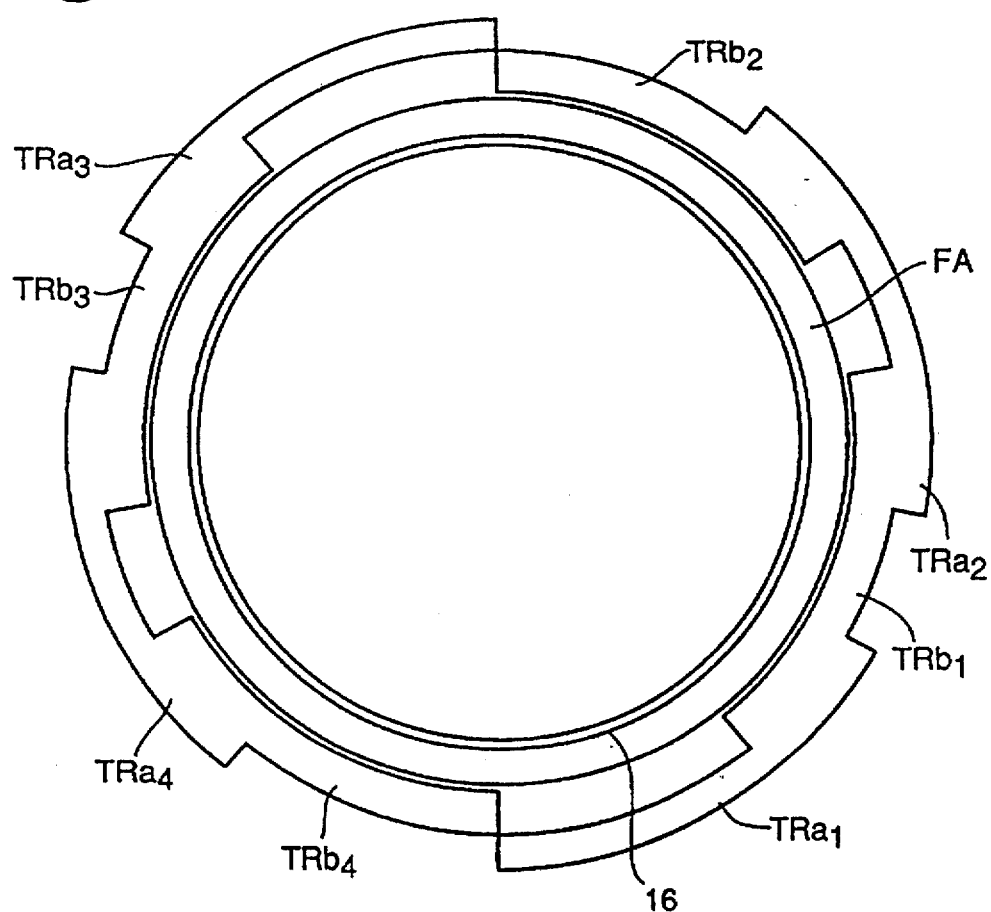
FIG. 11 is a top view showing a cylinder and tracking coil pairs affixed thereon in an optical pickup device according to a second embodiment of the present invention.
Figure 12:
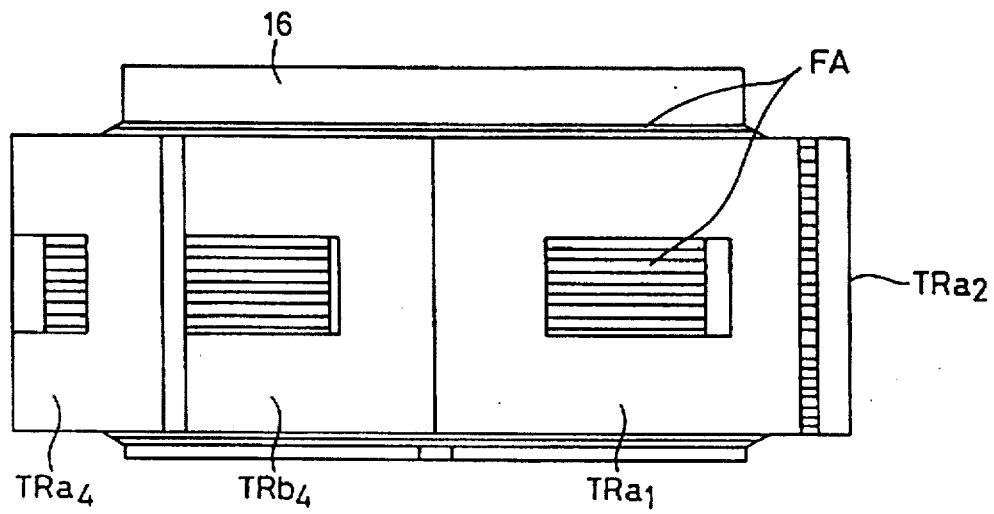
FIG. 12 is a front view of the cylinder and the tracking coil pairs shown in FIG. 11.
Figure 13:
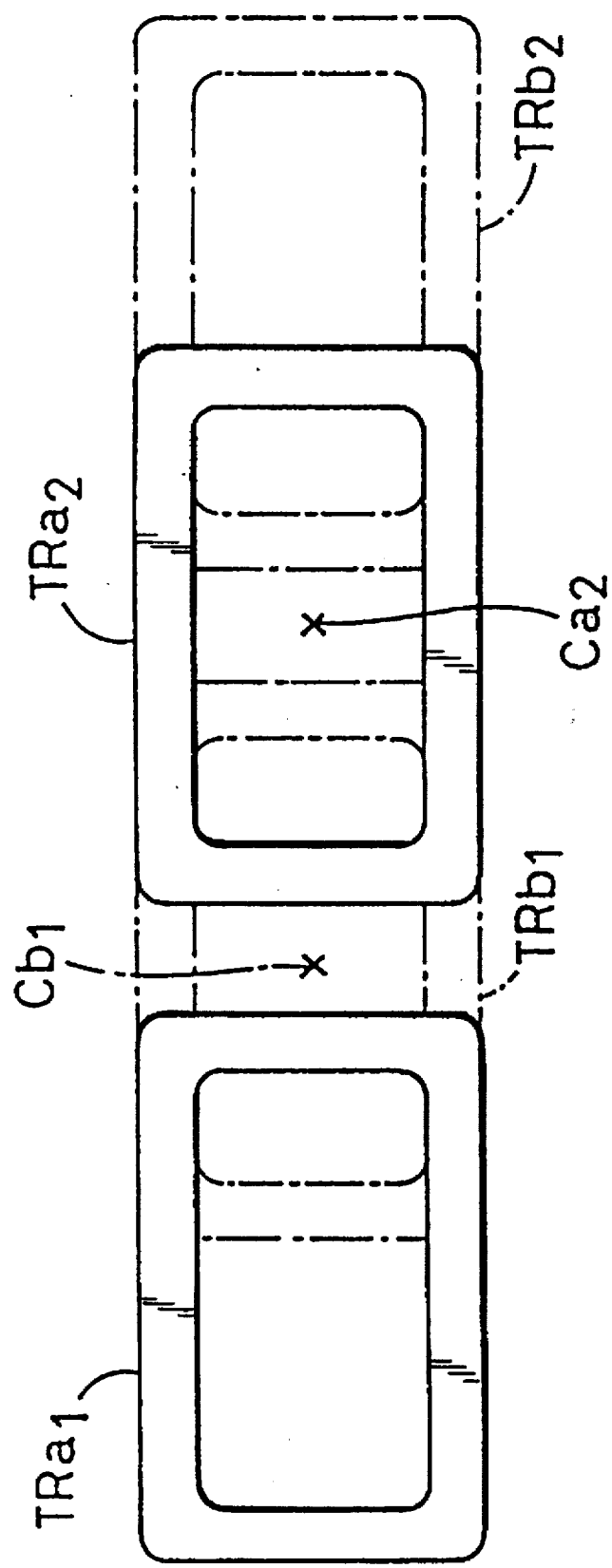
FIG. 13 is a development showing two tracking coil pairs in FIGS. 11 and 12 in a planar manner.

In the above described first embodiment, tracking coil pairs TRa1, TRa2, and TRa3, TRa4 are displaced from tracking coil pairs TRb1, TRb2, and TRb3, TRb4 by a predetermined angle. However, in this second embodiment, tracking coils TRa1 and TRa2 are positioned in symmetry to each other on both sides of the center Cb1 of tracking coil TRb1 as shown in FIGS. 11 to 13. From the opposite standpoint, tracking coil TRb1 is positioned so that the center Cb1 of tracking coil TRb1 matches an intermediate position between tracking coils TRa1 and TRa2. In addition, tracking coils TRb1 and TRb2 are positioned in symmetry to each other on both sides of the center Ca2 of tracking coil TRa2. From the opposite standpoint, tracking coil TRa2 is positioned so that the center Ca2 of tracking coil TRa2 matches an intermediate position between tracking coils TRb1 and TRb2. The positional relationship between tracking coil pairs TRa3, TRa4, and TRb3, TRb4 is the same as that of tracking coil pairs TRa1, TRa2, and TRb1, TRb2. By affixing these tracking coil pairs onto the cylindrical surface in such a positional relationship, two tracking coil pairs are used for tracking control, while the remaining two tracking coil pairs function as a damper which substitutes for rubber or spring.

Figure 14:
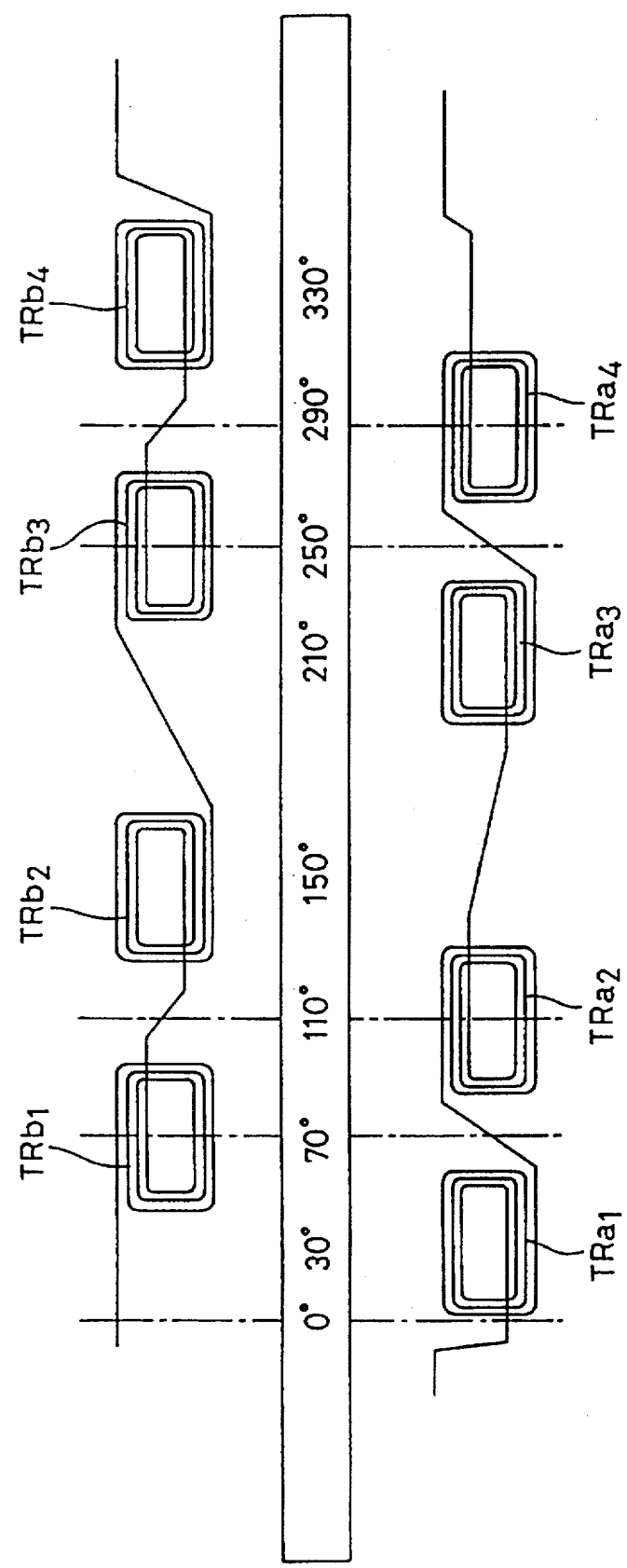
FIG. 14 shows a positional relationship between two tracking coil pairs and the other two tracking coil pairs in FIGS. 11 and 12.

Referring to FIG. 14, tracking coils TRa1 to TRa4 for SD are connected in series, and tracking coils TRb1 to TRb4 for CD are also connected in series. Tracking coil TRa3 is displaced from tracking coil TRa1 by 180°. Tracking coil TRa4 is displaced from tracking coil TRa2 by 180°. Tracking coil TRb3 is displaced from tracking coil TRb1 by 180°. Tracking coil TRb4 is displaced from tracking coil TRb2 by 180°. Each of tracking coils TRa1 to TRa4 is displaced from corresponding tracking coil TRb1, TRb2, TRb3 or TRb4 by 40°. More specifically, tracking coils TRb1 to TRb4 are affixed onto the cylindrical surface of cylinder 16, and tracking coils TRa1 to TRa4 are affixed thereon with a displacement of 40°. This second embodiment is characterized in that a tracking coil for CD is affixed onto the cylindrical surface so that the center of the tracking coil for CD is positioned between paired tracking coils for SD, and that a tracking coil for SD is affixed onto the cylindrical surface so that the center of the tracking coil for SD is positioned between paired tracking coils for CD.

Operation of an optical pickup device having such tracking coils will now be described.

(1) Lens switching operation

Figure 15A:
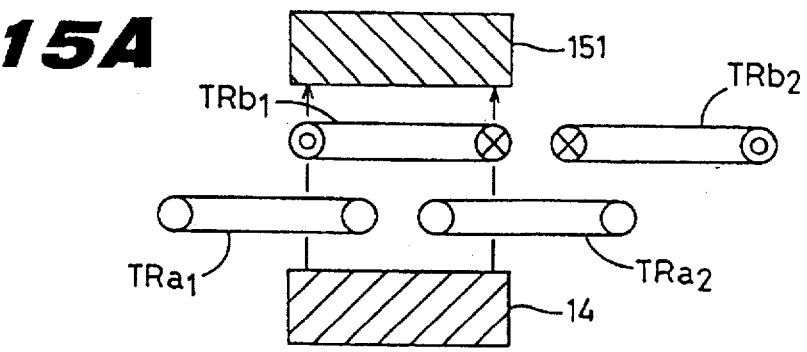
FIGS. 15A to 15D are schematic sectional views for describing operation of the tracking coil pairs shown in FIGS. 11 to 14.
Figure 15B:
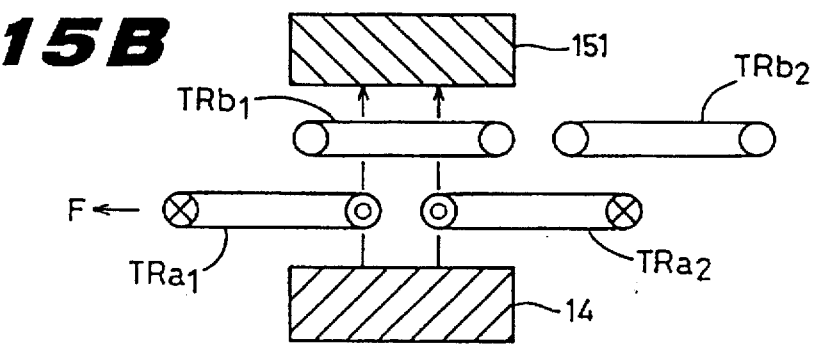

In FIGS. 15A to 15D, ⊙ indicates the case where a current flows in a direction from the back side to the front side of the paper, and α indicates the case where a current flows in a direction from the front side to the back side of the paper. FIG. 15A shows the state of tracking coils TRa1, TRa2, TRb1, and TRb2 at the time of reproduction of an optical disk according to the SD standard. As shown in FIG. 15A, in response to detect signals RS and LS from tracking sensor 19 in FIG. 10, a current flowing like an alternating current is supplied to tracking coils TRa1 and TRa2. On the other hand, a direct current from d.c. power source 7 in FIG. 10 is supplied to tracking coils TRb1 and TRb2. Therefore, tracking coils TRa1 and TRa2 move objective lens La right and left so that the laser beam always traces a track on the SD specified optical disk with a high fidelity. On the other hand, tracking coil TRb1 serves as a damper to be described later.

When an optical disk of the CD standard instead of the SD specified optical disk is set, controller 6 in FIG. 10 generates control signal LENS at the H level. In response to this signal, switch 3 supplies an output signal from differential amplifier 2 to driver 4, and a direct current from d.c. power source 8 to driver 5. Therefore, the direct current is not supplied to tracking coils TRb1 and TRb2. On the other hand, the direct current starts to be supplied to tracking coils TRa1 and TRa2. As a result, the direct current flows in conductive lines of tracking coils TRa1 and TRa2 between magnet 14 and projection 151 of yoke 15 from the back side to the front side of the paper on which the view of FIG. 15A is depicted. Since a magnetic field is generated perpendicular to these conductive lines, an electromagnetic force F is applied to tracking coils TRa1 and TRa2.

Figure 15C:
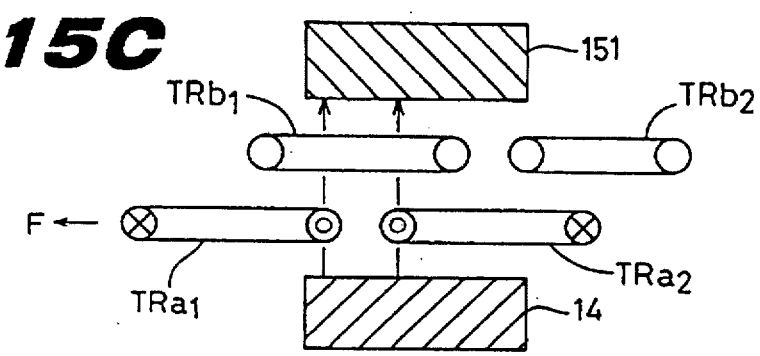

Consequently, tracking coils TRa1 and TRa2 rotate cylinder 16, causing tracking coils TRa1 and TRa2, TRb1, and TRb2 to move leftward as shown in FIG. 15C.

Figure 15D:
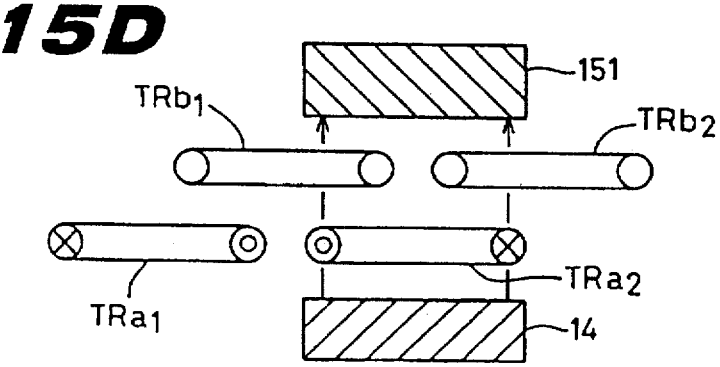

As shown in FIG. 15D, the entire tracking coil TRa1 exits from the magnetic field and the entire tracking coil TRa2 enters the magnetic field. Since the direct current flows in conductive lines on one side of tracking coil TRa2 from the back side to the front side of the paper on which the view of FIG. 15D is depicted, while the direct current flows in conductive lines on the other side from the front side to the back side of the paper, an electromagnetic force applied to the conductive lines on the one side is canceled by that on the other side. Therefore, tracking coil TRa2 stops cylinder 16 at a position shown in FIG. 15D. At this time, since a current flowing like an alternating current is supplied to tracking coils TRb1 and TRb2 in response to detect signals RS and LS from tracking sensor 19, these tracking coils TRb1 and TRb2 move objective lens Lb for CD right and left so that the laser beam traces a track on the CD specified optical disk with a high fidelity.

As described above, according to the second embodiment, tracking coil TRb1 or TRb2 (TRb3 or TRb4) for CD is positioned in the magnetic field of magnet 14 at the time of reproduction of the SD specified optical disk. On the other hand, at the time of reproduction of the CD specified optical disk, tracking coil TRa1 or TRa2 (TRa3 or TRa4) for SD is positioned in the magnetic field of magnet 14. Since the direct current is supplied to tracking coils TRb1 to TRb4 for CD at the time of reproduction of the SD specified optical disk, the tracking coils for CD positioned in the magnetic field serve as damper. On the other hand, since the direct current is supplied to tracking coils TRa1 to TRa4 for SD at the time of reproduction of the CD specified optical disk, the tracking coils for SD positioned in the magnetic field serve as a damper. When the tracking coils supplied with the direct current are positioned just at the center of the magnetic field, no electromagnetic force is applied to the damper. However, as the tracking coils are displaced from the center of the magnetic field, the electromagnetic force toward the center of the magnetic field applied to the tracking coils increases. Therefore, such tracking coils serve as a damper, similarly to rubber or spring.

(2) Damper function

Figure 16A:
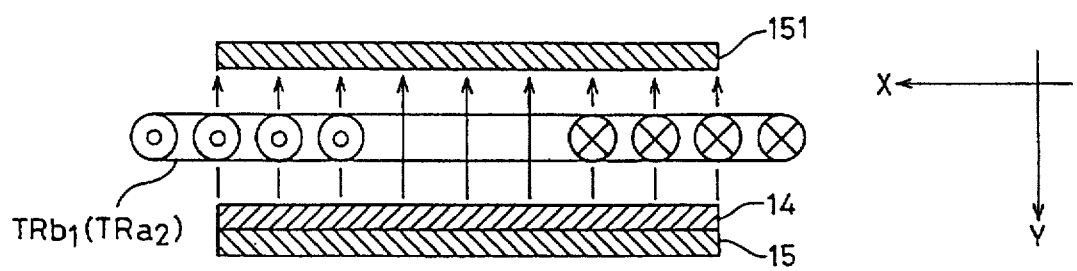
FIGS. 16A to 16C are schematic sectional views for describing a damper function of the tracking coil pairs shown in FIGS. 11 to 14.
Figure 16B:
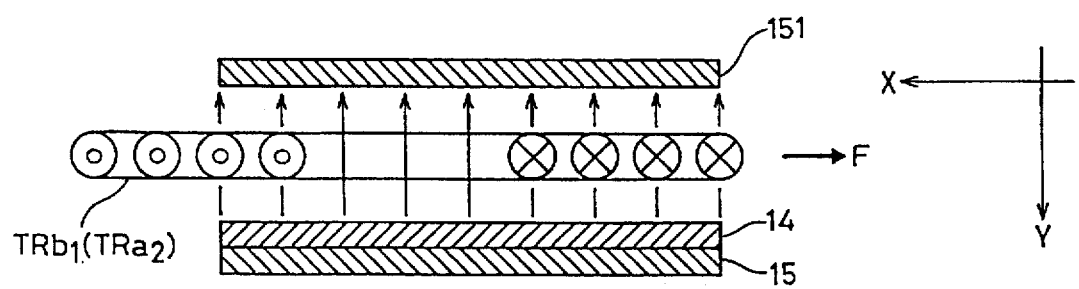
Figure 16C:
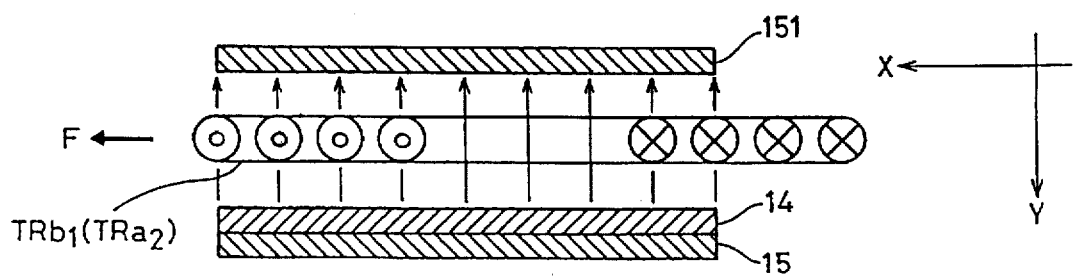

This damper function will be described in detail with reference to FIGS. 16A to 16C. In these figures, ⊗ indicates the case where a current flows in a direction from the back side to the front side (+Z direction) of the paper, and ⊗ indicates the case where a current flows in a direction from the front side to the back side (−Z direction) of the paper. In FIGS. 16A to 16C, yoke 15, magnet 14, and tracking coil TRb1 (TRa2) in FIG. 1 are cut along a plane X–Y in parallel to the main surface of lens holder 13. For facility of description, magnet 14, tracking coil TRb1 (TRa2), and projection 151 of yoke 15 are shown in a planar manner.

When the optical axis of objective lens La for SD matches an optical path of the laser beam, tracking coil TRb1 is positioned at the center of the magnetic field of magnet 14 as shown in FIG. 16A. On the other hand, when the optical axis of objective lens Lb for CD matches an optical path of the laser beam, tracking coil TRa2 is positioned at the center of the magnetic field. Therefore, the number of conductive lines through which a current flows from the back side to the front side of the paper equals to the number of conductive lines through which a current flows from the front side to the back side of the paper, whereby electromagnetic forces applied to the conductive lines on both sides are canceled by each other. Therefore, tracking coil TRb1 (TRa2) does not move, and consequently, objective lens La (Lb) does not move.

When objective lens La (Lb) is displaced to the right side, tracking coil TRb1 (TRa2) usually moves leftward as shown in FIG. 16B. As a result, the number of conductive lines through which a current flows from the front side to the back side of the paper is greater than the number of conductive lines through which a current flows from the back side to the front side of the paper. Therefore, the electromagnetic force F in the −X direction on the right side in the figure is applied to tracking coil TRb1 (TRa2). Accordingly, tracking coil TRb1 (TRa2) rotates cylinder 16, resulting in movement of objective lens La (Lb) to its original position.

When objective lens La (Lb) is further displaced to the right side than the above case, an electromagnetic force larger than the above case is applied to tracking coil TRb1 (TRa2). This is because the conductive lines through which a current flows from the front side to the back side of the paper approach the center of the magnetic field having a high magnetic flux density.

On the other hand, when objective lens La (Lb) is displaced to the left side which is opposite to the above, the number of conductive lines through which a current flows from the back side to the front side of the paper is greater than the number of conductive lines through which a current flows from the front side to the back side of the paper, as shown in FIG. 16C. Therefore, the electromagnetic force F +X in the direction on the left side in the figure is applied to tracking coil TRb1 (TRa2). Consequently, tracking coil TRb1 (TRa2) rotates cylinder 16, resulting in movement of objective lens La (Lb) to its original position.

When objective lens La (Lb) is further displaced to the left side than the above case, the electromagnetic force F in the +X direction on the left side in the figure applied to tracking coil TRb1 (TRa2) increases. This is because the conductive lines through which a current flows from the back side to the front side of the paper approach the center of the magnetic field having a high magnetic flux density.

As described above, when objective lens La for SD is selected, two of tracking coils TRb1 to TRb4 for CD are positioned at the center of the magnetic field. When these tracking coils for CD are displaced in one direction, an electromagnetic force in a direction opposite thereto is applied to these tracking coils for CD. As a result, these tracking coils for CD move objective lens La for SD back to its original position. On the other hand, when objective lens Lb for CD is selected, two of tracking coils TRa1 to TRa4 for CD are positioned at the center of the magnetic field. When objective lens Lb for CD is displaced in one direction, the tracking coils for SD are also displaced in one direction accordingly. However, since an electromagnetic force in a direction opposite thereto is applied to the tracking coils for SD, the tracking coils for SD move objective lens Lb for CD back to its original position. Therefore, the tracking coils corresponding to a non-selected objective lens can perform a damper function similarly to rubber or spring.

Although displacement of the tracking coils in the X direction was described above, the similar function to the above holds for displacement in the Z direction perpendicular to the paper. More specifically, the upper side conductive lines and the lower side conductive lines of the tracking coils are positioned in the magnetic field of magnet 14, similarly to the right side conductive lines and the left side conductive lines of the tracking coils shown in FIG. 16. Therefore, an electromagnetic force is also applied to the upper side conductive lines and the lower side conductive lines, similarly to the right side conductive liens and the left side conductive lines of the tracking coils. Consequently, vibration of objective lenses La and Lb in the Z direction is also suppressed by the tracking coils.

If the amount of direct current supplied to the tracking coils is increased, the damper effect by the tracking coils increases. Unlike the case of rubber or spring, the strength of the damper effect by the tracking coils can be set arbitrarily. Therefore, in an optical pickup device selectively reproducing information on the SD specified optical disk and the CD specified optical disk, by supplying a larger current to tracking coils TRb1 to TRb4 for CD, the damper effect can be increased, and this optical pickup device can be provided with a higher resonance frequency so as to match the rotation speed of the SD specified optical disk, at the time of reproduction of the SD specified optical disk. By supplying a smaller current to tracking coils TRa1 to TRa4 for SD, the damper effect can be decreased, and this optical pickup device can be provided with a lower resonance frequency so as to match the rotation speed of the CD specified optical disk, at the time of reproduction of the CD specified optical disk.

Therefore, it is desired to change the amount of direct current to be supplied to the tracking coils used as a damper according to a reproduction position of the optical pickup device, thereby always changing the resonance frequency of the optical pickup device according to the rotation speed of the optical disk. In a conventional optical pickup device using a mechanical damper such as rubber or spring, the strength of the damper effect cannot be changed according to its reproduction position. Therefore, the amount of direct current to be supplied to the tracking coils may practically be set constant independent of the reproduction position.

In the above embodiments, the amount of direct current to be supplied to the tracking coils is changed according to the type of set optical disk. However, in an optical pickup device selectively reproducing information on the MMCD specified optical disk and the SD specified optical disk, the direct current for MMCD may be merged with the direct current for SD. Only when reproducing information on the CD specified optical disk using an objective lens for MMCD, a small amount of direct current may be supplied to the tracking coils for SD. Instead of the direct current, a pulse current of a low frequency may be supplied in order to reduce power consumption.

This can be applied to switching between a magnetooptic disk having a thickness of 0.8 mm shown in Table 3 and the CD specified or MMCD specified optical disk. This can also be applied to switching between an optical disk having a thickness of 0.8 mm and the SD specified optical disk.

Tracking control of an objective lens is carried out by tracking coils corresponding to a selected objective lens, and positioning control of an objective lens is carried out by tracking coils not corresponding to the selected objective lens. Therefore, the load of the tracking coils for tracking control is alleviated, and precision of positioning control for matching the optical axis of the objective lens to an optical path of the laser beam is improved. Further, since switching is carried out between two objective lenses according to the thickness or the recording density of the optical disk, reproduction can be carried out on two optical disks of different types.

Between tracking coils of one pair, one of tracking coils of another pair is positioned, and one of tracking coils of the one pair is positioned between tracking coils of the another pair. Therefore, by supplying a direct current to the tracking coils corresponding to the non-selected objective lens, the tracking coils can serve as a damper similarly to rubber or spring.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device, comprising:
 a laser for directing a laser beam to an optical disk;
 a first convergent objective lens arranged to converge said laser beam on a recording surface of one type of optical disk that has a substrate of a first thickness;
 a second convergent objective lens arranged to converge said laser beam on a recording surface of another type of optical disk that has a substrate of a second thickness smaller than said first thickness; and
 a moving unit for selectively moving said first and second objective lenses so that their optical axes match an optical path of said laser beam according to the type of optical disk on which the laser beam is to be converged.

2. The optical pickup device according to claim 1 wherein said first thickness is 1.15 mm to 1.25 mm, and
 said second thickness is 0.55 mm to 0.65 mm.

3. The optical pickup device according to claim 1, wherein
 said first thickness is 1.15 mm to 1.25 mm, and
 said second thickness is 0.75 mm to 0.85 mm.

4. The optical pickup device according to claim 1, wherein
 said first thickness is 0.75 mm to 0.85 mm, and
 said second thickness is 0.55 mm to 0.65 mm.

5. The optical pickup device according to claim 1, wherein
 said one type of optical disk has a first recording density,
 said another type of optical disk has a second recording density higher than said first recording density,
 said optical pickup device further comprising
 a holder for holding in common said first objective lens and said second objective lens positioned closer to a periphery of said optical disk than said first objective lens.

6. An optical pickup device, comprising:
 a laser for directing a laser beam to an optical disk;
 a first convergent objective lens arranged to converge said laser beam on a recording surface of one type of optical disk;
 a second convergent objective lens arranged to converge said laser beam on a recording surface of another type of optical disk; and
 a moving unit for selectively moving said first and second objective lenses so that their optical axes match an optical path of said laser beam according to the type of optical disk on which the laser beam is to be converged;
 a holder for holding said first and second objective lenses in common,
 wherein said moving unit moves said holder to move said first and second objective lenses.

7. The optical pickup device according to claim 6, further comprising:
 a shaft for rotatably supporting said holder;
 a first conductive line fixed to said holder in parallel with said shaft;
 a second conductive line fixed to said holder in parallel with said shaft;
 a magnetic field generator for generating a magnetic field in a direction perpendicular to said first and second conductive lines and crossing said shaft; and
 a tracking controller for, when said first objective lens is moved so that its optical axis matches an optical path of said laser beam, supplying a current to said first conductive line in one direction upon displacement of said laser beam to one side of a track of said optical disk and supplying the current to said first conductive line in the other direction opposite to said one direction upon displacement of said laser beam to the other side opposite to said one side, and for, when said second objective lens is moved so that its optical axis matches an optical path of said laser beam, supplying the current to said second conductive line in one direction upon displacement of said laser beam to one side of the track of said optical disk and supplying the current to said second conductive line in the other direction opposite to said one direction upon displacement of said laser beam to the other side opposite to said one side.

8. An optical pickup device, comprising:
 a laser for directing a laser beam to an optical disk;
 a first convergent objective lens arranged to converge said laser beam on a recording surface of one type of optical disk having a first recording density;
 a second convergent objective lens arranged to converge said laser beam on a recording surface of another type of optical disk having a recording density higher than said first recording density; and
 a moving unit for selectively moving said first and second objective lenses so that their optical axes match an optical path of said laser beam according to the type of optical disk on which said laser beam is to be converged,
 said optical pickup device further comprising
 a holder for holding in common said first objective lens and said second objective lens with said second objective lens positioned closer to the center of said optical disk than said first objective lens.

9. An optical pickup device, comprising:
 a laser for directing a laser beam to an optical disk;
 a first convergent objective lens arranged to converge said laser beam on each track of one type of optical disk having a first track pitch;
 a second convergent objective lens arranged to converge said laser beam on each track of another type of optical disk having a second track pitch narrower than said first track pitch; and
 a moving unit for selectively moving said first and second objective lenses so that their optical axes match an optical path of said laser beam according to the type of optical disk.

10. The optical pickup device according to claim 9, wherein
said first track pitch is 1.5 μm to 1.7 μm, and
said second track pitch is 0.695 μm to 0.755 μm.

11. The optical pickup device according to claim 9, wherein
said first track pitch is 1.5 μm to 1.7 μm, and
said second track pitch is 0.81 μm to 0.87 μm.

12. The optical pickup device according to claim 9, wherein
said first track pitch is 0.81 μm to 0.87 μm, and
said second track pitch is 0.695 μm to 0.755 μm.

13. An optical pickup device, comprising:
a laser for directing a laser beam to an optical disk;
a first convergent objective lens arranged to converge said laser beam on a recording surface of one type of optical disk;
a second convergent objective lens arranged to converge said laser beam on a recording surface of another type of optical disk; and
a moving unit for selectively moving said first and second objective lenses so that their optical axes match an optical path of said laser beam according to the type of optical disk, wherein
said laser beam has a wavelength of 620 nm to 665 nm.

14. An optical pickup device, comprising:
a laser for directing a laser beam to an optical disk;
a first convergent objective lens arranged to converge said laser beam on a recording surface of one type of optical disk;
a second convergent objective lens arranged to converge said laser beam on a recording surface of another type of optical disk; and
a moving unit for selectively moving said first and second objective lenses so that their optical axes match an optical path of said laser beam according to the type of optical disk,
said laser includes
a first laser element for directing a first laser beam having a first wavelength,
a second laser element for directing a second laser beam having a second wavelength longer than said first wavelength, and
an activating unit for selectively activating said first and second laser elements according to the type of optical disk.

15. The optical pickup device according to claim 14, wherein
said first wavelength is 620 nm to 665 nm, and
said second wavelength is 765 nm to 795 nm.

16. An optical pickup device, comprising:
a laser for directing a laser beam to an optical disk;
a first convergent objective lens arranged to converge said laser beam on a recording surface of one type of optical disk;
a second convergent objective lens arranged to converge said laser beam on a recording surface of another type of optical disk; and
a moving unit for selectively moving said first and second objective lenses so that their optical axes match an optical path of said laser beam according to the type of optical disk, and
a tracking controller for controlling said moved objective lens so that said laser beam traces a track of said optical disk.

17. An optical pickup device, comprising:
a laser for directing a laser beam to an optical disk;
a first objective lens having a first numerical aperture;
a second objective lens having a second numerical aperture larger than said first numerical aperture;
a holder for holding said first and second objective lenses in common; and
a shaft for rotatably supporting said holder;
said holder having a cylindrical surface with an axis common to said shaft,
said optical pickup device further comprising:
a magnetic field generator for generating a magnetic field perpendicular to said cylindrical surface;
a first coil pair including
a first coil affixed onto said cylindrical surface, and
a second coil located apart from said first coil and affixed onto said cylindrical surface; and
a second coil pair including
a third coil positioned between the center of said first coil and the center of said second coil and affixed onto said cylindrical surface, and
a fourth coil located apart from said third coil and affixed onto said cylindrical surface,
said first coil being positioned between the center of said third coil and the center of said fourth coil;
said optical pickup device further comprising:
a lens positioning unit for selectively supplying a positioning current to said first and second coil pairs according to the type of said optical disk; and
a tracking controller for, when said positioning current is supplied to said first coil pair, supplying a tracking drive current to said second coil pair in one direction upon displacement of said laser beam to one side of a track of said optical disk and supplying the tracking drive current to said second coil pair in the other direction opposite to said one direction upon displacement of said laser beam to the other side opposite to said one side, and for, when said positioning current is supplied to said second coil pair, supplying the tracking drive current to said first coil pair in one direction upon displacement of said laser beam to one side of the track of said optical disk and supplying the tracking drive current to said first coil pair in the other direction opposite to said one direction upon displacement of said laser beam to the other side opposite to said one side.

18. An optical reproducing apparatus, comprising:
a laser for directing a laser beam to an optical disk;
a first objective lens having a first numerical aperture;
a second objective lens having a second numerical aperture larger than said first numerical aperture;
a holder for holding said first and second objective lenses in common;
a moving unit for moving said holder so that optical axes of said first and second objective lenses selectively match an optical path of said laser beam according to the type of said optical disk;
a detector for detecting light reflected from said optical disk; and
a signal processing circuit for generating a video and/or sound signal by applying predetermined processing to an output signal from said detector.

* * * * *